(12) United States Patent
Beggs

(10) Patent No.: US 6,491,234 B2
(45) Date of Patent: Dec. 10, 2002

(54) BOOM SPRAYER AND METHOD OF SPRAYING

(76) Inventor: Robert D. Beggs, N6875 5$^{th}$ Ave., Plainfield, WI (US) 54966

(*) Notice: Subject to any disclaimer, the term of this patent is extended or adjusted under 35 U.S.C. 154(b) by 0 days.

(21) Appl. No.: 09/808,420

(22) Filed: Mar. 14, 2001

(65) Prior Publication Data

US 2002/0020760 A1 Feb. 21, 2002

Related U.S. Application Data

(63) Continuation-in-part of application No. PCT/US99/21085, filed on Sep. 15, 1999, which is a continuation of application No. 09/176,589, filed on Oct. 21, 1998, now Pat. No. 6,085,993.
(60) Provisional application No. 60/100,328, filed on Sep. 15, 1998.

(51) Int. Cl.$^7$ ................................................. B05B 1/20
(52) U.S. Cl. ....................................... 239/166; 239/172
(58) Field of Search .......................... 239/159–161, 239/163–170, 172

(56) References Cited

U.S. PATENT DOCUMENTS

| | | | |
|---|---|---|---|
| 1,024,239 A | 4/1912 | Willis | 239/165 |
| 2,965,307 A | 12/1960 | High | 239/165 X |
| 2,995,307 A | 8/1961 | McMahon | 239/161 |
| 3,055,594 A | 9/1962 | Nansel | 239/161 |
| 3,074,649 A | 1/1963 | Atkinson | 239/165 |
| 3,514,038 A | 5/1970 | McQuinn | 239/165 |
| 4,344,572 A * | 8/1982 | Tyler | 239/168 |
| 4,784,324 A | 11/1988 | DeWitt et al. | 239/165 |
| 5,348,226 A * | 9/1994 | Heiniger et al. | 239/1 |
| 5,375,767 A * | 12/1994 | Thorstensson | 239/164 |
| 5,507,435 A * | 4/1996 | Benest | 239/1 |
| 6,234,407 B1 * | 5/2001 | Knight et al. | 239/163 |
| 6,315,218 B1 * | 11/2001 | Guesdon | 239/159 |

FOREIGN PATENT DOCUMENTS

| | | | |
|---|---|---|---|
| DE | 61154 | 5/1968 | 239/165 |
| DE | 2309718 | 8/1974 | 239/161 |
| EP | 118366 | 9/1984 | 239/167 |
| GB | 2151891 | * 7/1985 | |
| GB | 2102661 | * 2/1993 | |

* cited by examiner

Primary Examiner—Lesley D. Morris
(74) Attorney, Agent, or Firm—Dorsey & Whitney LLP

(57) ABSTRACT

A boom sprayer having an inner boom section and an extendable outer boom section with a plurality of spray head valves which are moved to an on or off position as the extendable boom section extends and retracts relative to the inner boom section. The invention also relates to a method of spraying with a boom sprayer and a mechanism for attaching the spray booms to a support vehicle.

16 Claims, 10 Drawing Sheets

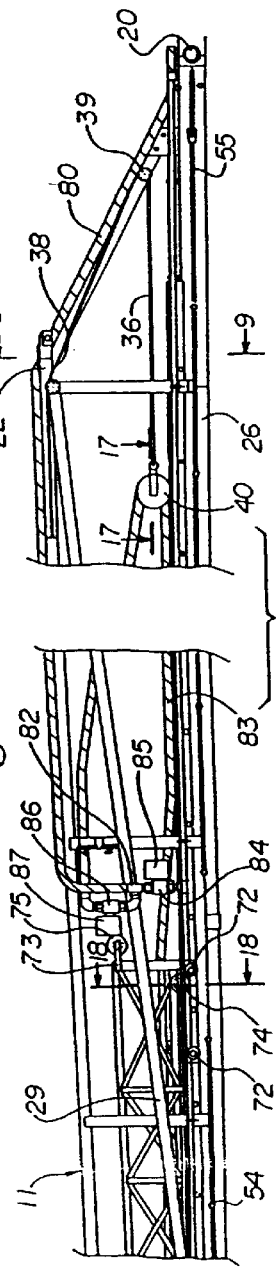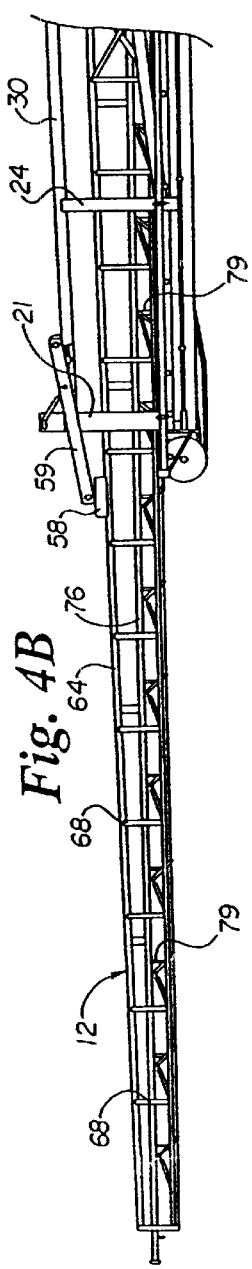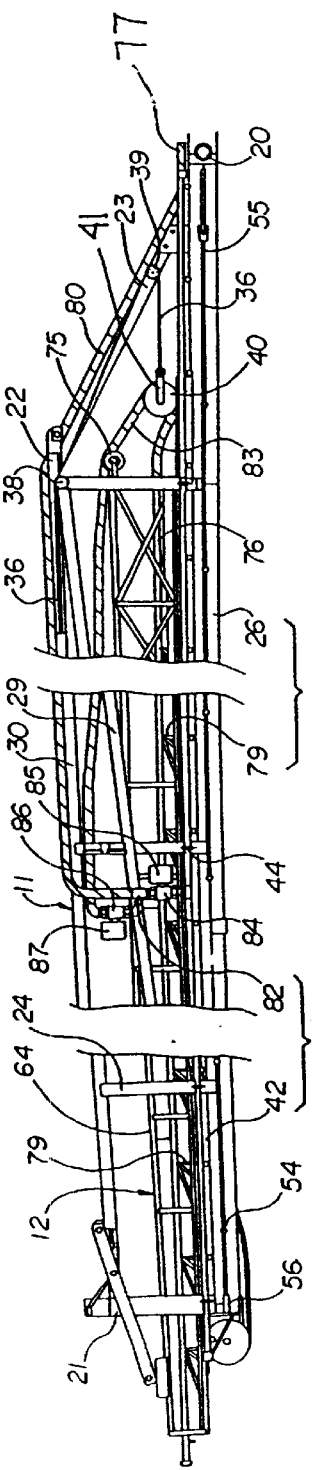

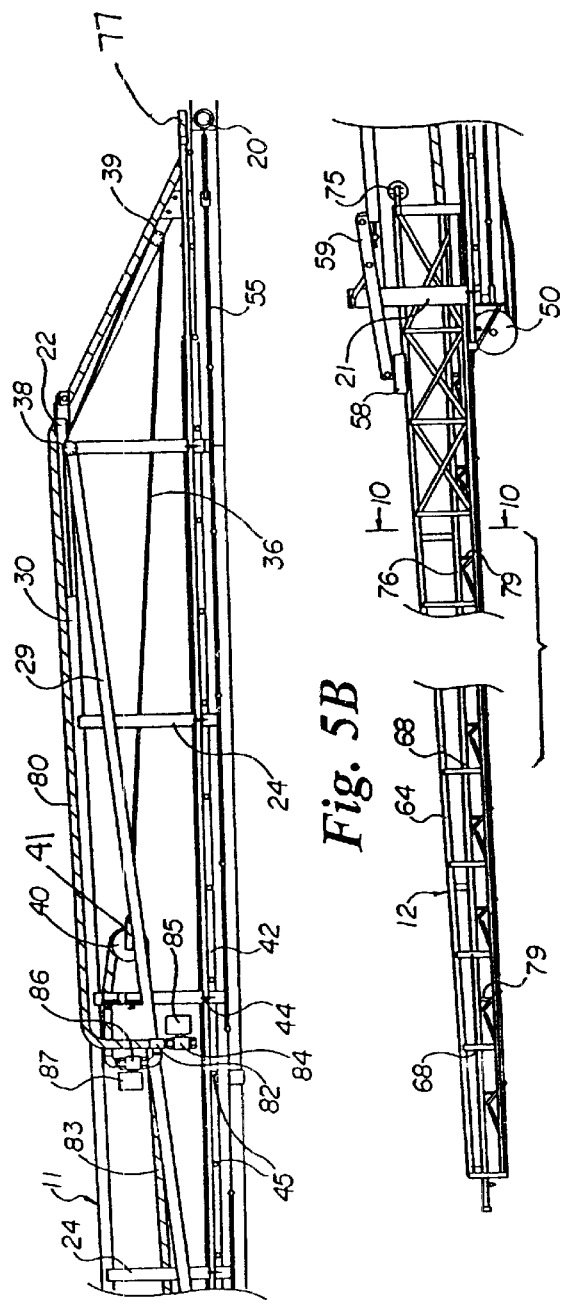
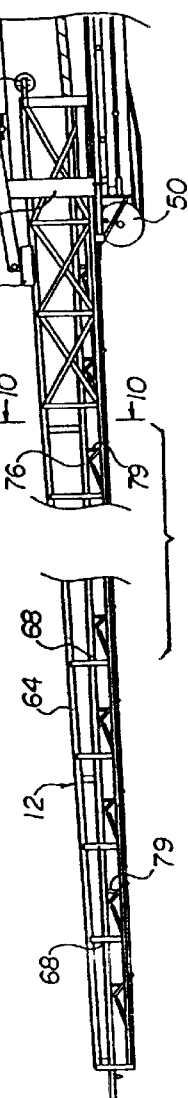
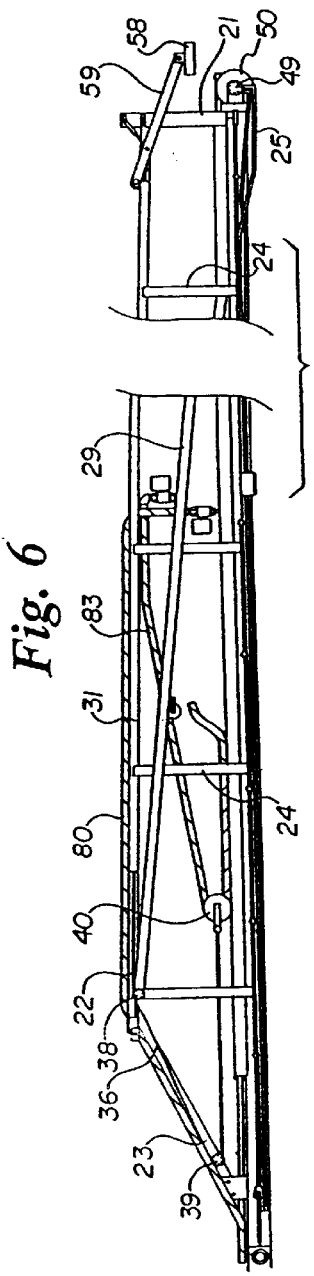
Fig. 5A
Fig. 5B
Fig. 6

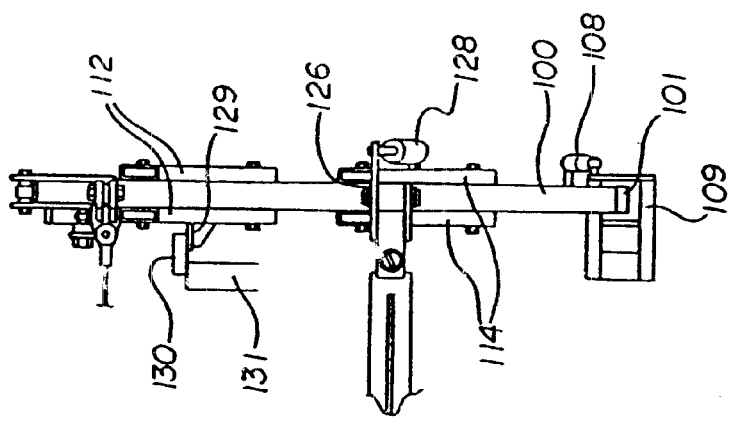
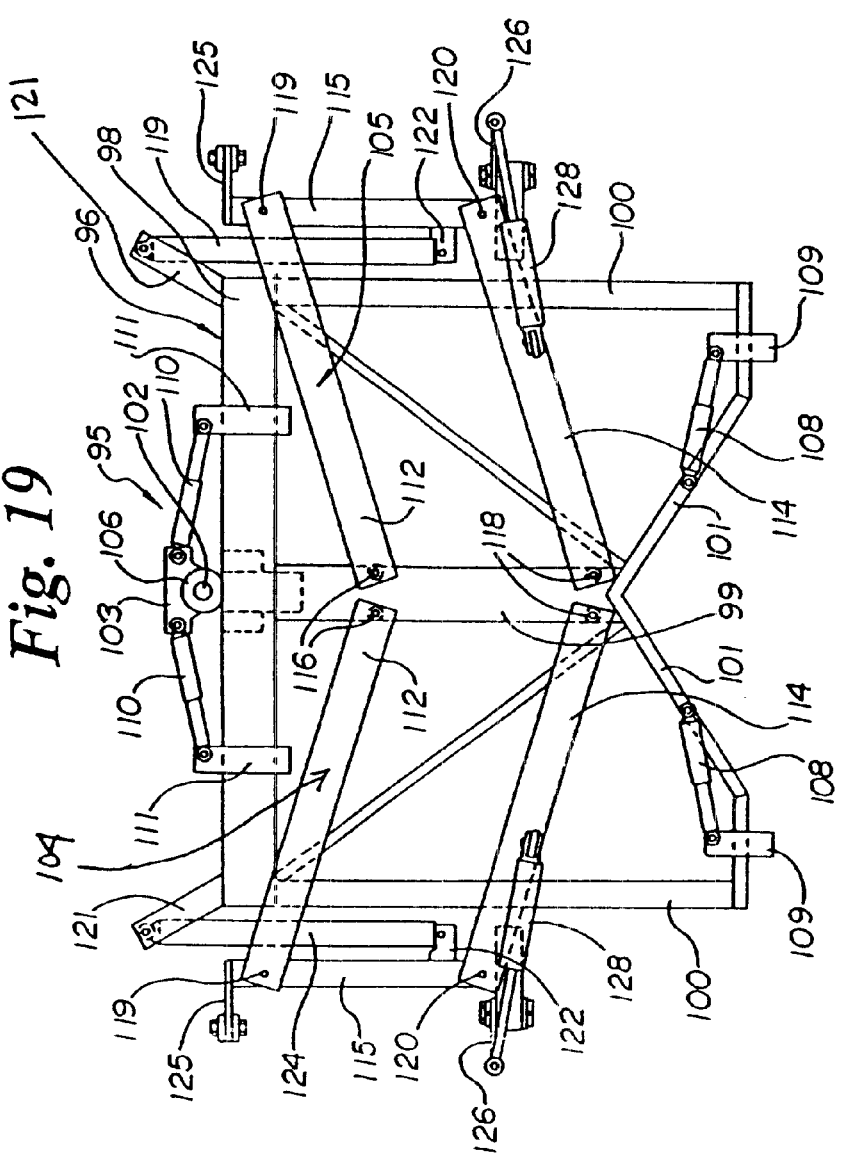

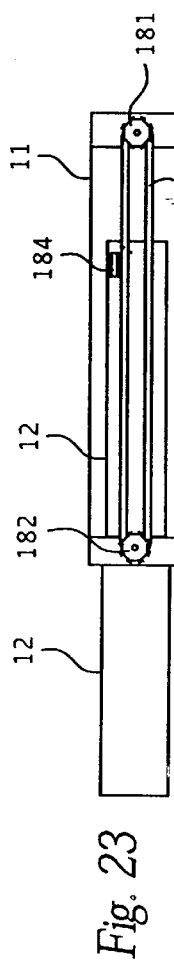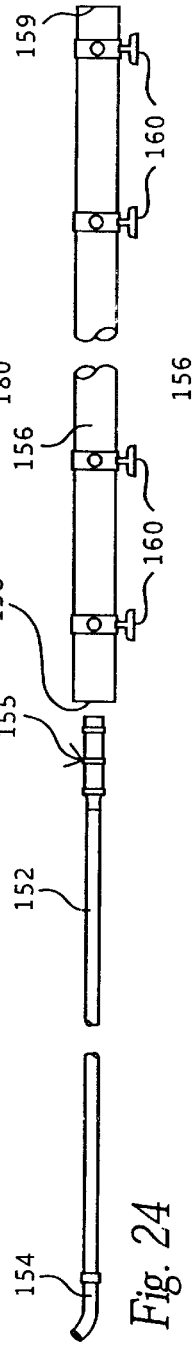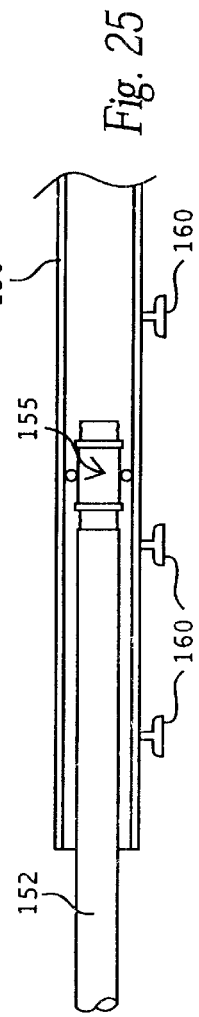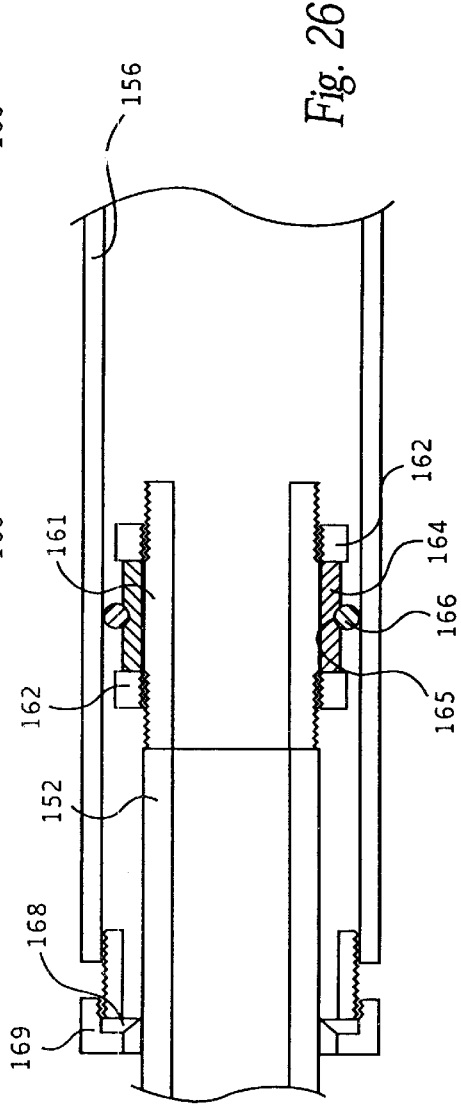

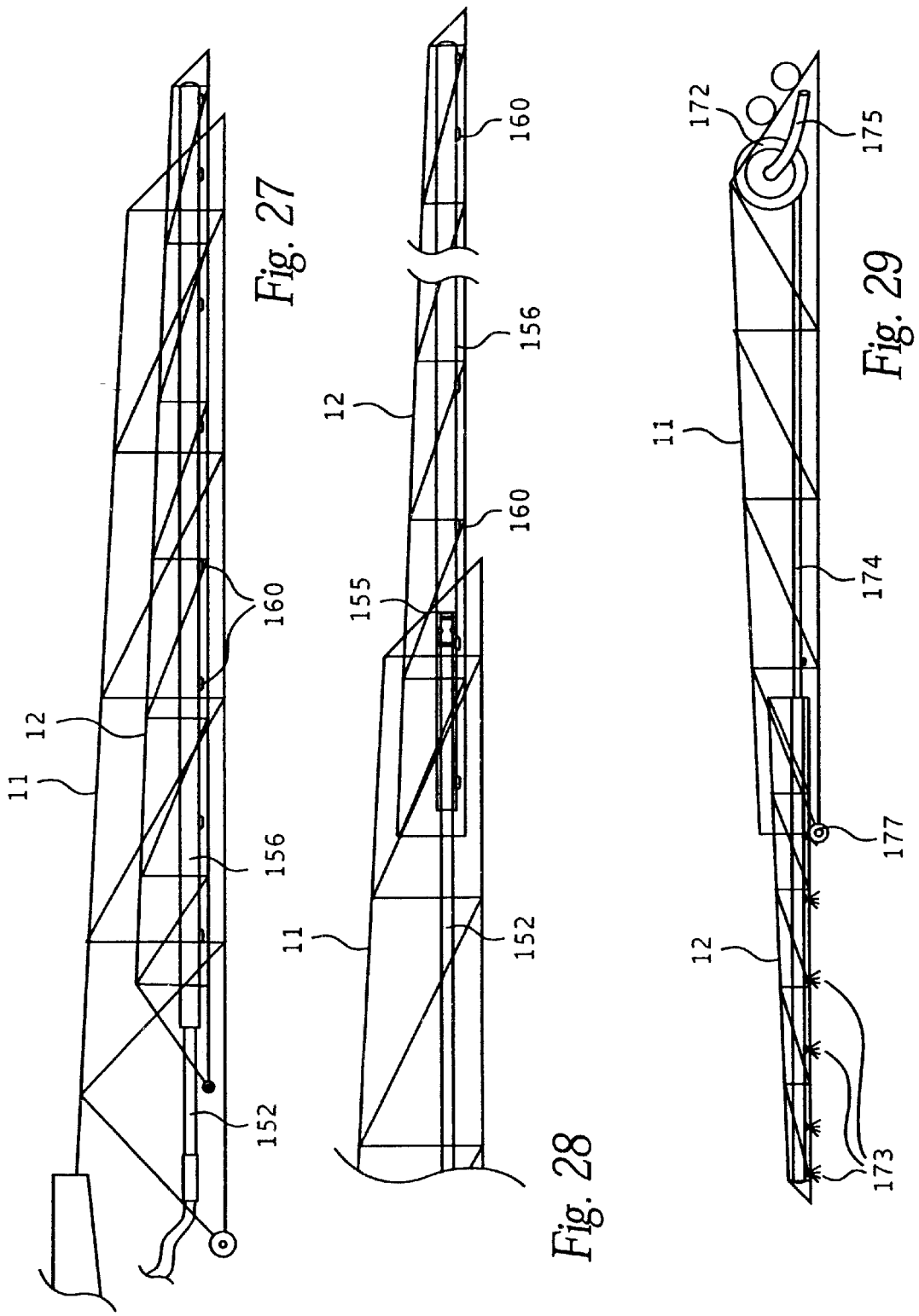

BOOM SPRAYER AND METHOD OF SPRAYING

RELATED APPLICATIONS

This application is a continuation-in-part of international application number PCT/US99/21085, filed Sep. 15, 1999, which claims the priority of provisional application No. 60/100,328, filed Sep. 15, 1998, and which is a continuation of non-provisional application which is a Ser. No. 09/176,589, filed Oct. 21, 1998, now U.S. Pat. No. 6,085,993, all of which are incorporated herein by reference.

BACKGROUND OF THE INVENTION

1. Field of the Art

The present invention relates generally to a boom sprayer, and more particularly to a telescoping boom sprayer having a plurality of telescoping booms carrying spray heads and moveable relative to one another. Still further, the present invention relates to a telescoping boom sprayer with spray head deactivation means to provide variable width spraying without an overlap in spraying and an improved means for connecting the same to the power unit. The invention also relates to an improved method of spraying agricultural crops and the like with a boom sprayer.

2. Description of the Prior Art

A variety of agricultural sprayers currently exist in the art. One common type of agricultural sprayer is a fixed boom or fixed length sprayer comprised of a tractor or other towing vehicle and a pair of articulated spray booms extending outwardly from opposite sides of the tractor or other towing vehicle. These booms, when extended, have a fixed length and are comprised of either single length booms or articulated boom sections which are folded in chicken wing fashion during non-use or transport. Agricultural sprayers and the like also exist which have a plurality of booms moveable relative to one another between an extended position and a retracted position.

Examples of existing spray implements include the McMahon U.S. Pat. No. 2,995,307 which discloses an articulated boom sprayer and the Nansel U.S. Pat. No. 3,055,594 which discloses an articulated, foldable boom type sprayer. The Atkinson U.S. Pat. No. 3,074,649 discloses a spraying apparatus having a single spray head at the end of a telescoping boom for spraying or washing a single element.

The High U.S. Pat. No. 2,962,307 discloses a plurality of extendable booms, with each boom having a plurality of spray heads. This patent discloses separate hoses and valves for each line of spray heads. Thus if it is desired for one spray head in a particular line to be used, all spray heads in that line must necessarily be used.

The DeWitt et al. U.S. Pat. No. 4,784,324 discloses a spraying apparatus for herbicidal and insecticidal application with an articulated and telescoping boom and with spray heads positioned on the boom.

Although many of the prior art sprayers, and in particular boom sprayers, are capable of spraying agricultural crops and the like over an extended width, they are generally incapable of spraying at lesser widths or at variable widths without a spraying overlap. Thus, to spray widths less than the maximum width of the sprayer, or to accommodate trees, posts or other obstacles that might be in the path of the sprayer booms, spraying overlap is necessary. This not only results in spraying more of the spray liquid than is needed and thereby increasing the spraying cost, but more importantly, results in double application or no application for portions of the crop being sprayed. This can lead to significantly reduced production for those areas or in some cases killing the crop as a result of over application.

Accordingly, there is a need in the art for an improved boom sprayer, and more particularly to an improved telescoping boom sprayer which is capable of spraying various widths without spray overlap.

SUMMARY OF THE INVENTION

In contrast to the prior art, the present invention relates to an improved telescoping boom sprayer which can spray crops and the like from a width of 75 feet to 120 feet or more and any width in between, with no spray overlap and with a single spray material supply to the extendable boom. Further, the boom sprayer in accordance with the present invention can fold up into a compact structure for transport or during non-use.

More specifically, the present invention includes a first elongated boom which has an inner end connected to a towing or support vehicle or the like and a second free end. A second telescoping or extendable boom is associated with the first boom and is designed for telescoping movement outwardly and inwardly relative to the first boom. In the preferred embodiment, both the first boom as well as the second boom are provided with a plurality of spray heads which are positioned in spaced relationship along the first and second booms, respectively. Each of the plurality of spray heads in the second or extendable boom is provided with a spray head valve which is moveable between an "on" or spray position and an "off" or non-spray position in response to movement of the second boom outwardly and inwardly relative to the first. With this structure, spray heads of the second boom which are positioned inwardly at the outer end of the first boom remain in an "off" or non-spray position, while second boom spray heads which are extended outwardly from the outer end of the first boom are moved to an "on" or spray position. This enables the boom sprayer of the present invention to spray over a variable width with no overlap.

A further aspect of the present invention relates to a boom sprayer having first and second or inner and outer booms moveable relative to one another and an improved means for supplying spray material to both the spray heads in the first or inner boom as well as the spray heads in the second or outer boom. In the preferred embodiment, this means includes an improved spray supply conduit having a first portion extending from near the inner end of the inner boom, a central portion connected to the inner boom at a connection point between the inner and outer ends of the inner boom and a second portion extending from the connection point to a spray supply conduit and thus to the plurality of spray heads on the outer or extendable boom.

Preferably at least the second portion of the spray supply conduit is comprised of a flexible hose to accommodate the varying length between the connection point and the inner end of the extendable boom as such boom is extended and retracted. A spray supply support is provided in the form of a pulley member associated with the flexible hose and a spring or bias member acting on the pulley to support the flexible hose and maintain it in a taut position during movement of the extendable boom.

A further aspect of the present invention relates to an improved method of agricultural spraying with a boom sprayer which includes an initial step of providing a boom sprayer having a first boom, a second boom moveable outwardly and inwardly relative to the first boom and a plurality of spray heads positioned along the second boom. Further steps include providing a supply of spray fluid to the spray heads, selectively moving the second or outer boom outwardly and inwardly relative to the first boom and individually actuating and de-actuating the spray heads as the second boom moves outwardly and inwardly relative to the first. This method enables the boom sprayer of the present invention to spray over variable widths with no spray overlap.

A still further aspect of the present invention is to provide an improved means for connecting the boom sprayer to the support or towing vehicle. This means includes a rear gantry which is both self leveling and is capable of independent actuation for each spray boom. The specific structure of the support means includes a pendulum-type support which is pivotally connected to the support vehicle. The pendulum includes shock absorbers which stabilize the rotational movement of the support relative to the vehicle and a pair of parallel linkages to support the respective booms so that they can be raised and lowered independently of one another.

Accordingly, it is an object of the present invention to provide an improved telescoping boom sprayer.

Another objection of the present invention is to provide a telescoping boom sprayer which is capable of spraying over variable widths without spray overlap.

Another object of the present invention is to provide an improved agricultural boom sprayer having a fixed boom and an extendable boom with a plurality of spray heads and improved means for opening the spray heads on the extendable boom as they move outwardly from the outer end of the fixed boom and closing such spray heads as they move inwardly from the outer end of the fixed boom to thereby provide variable width spraying.

A further object of the present invention is to provide an improved means for providing spray material to the spray heads on the extendable boom of a telescoping boom sprayer.

A still further object of the present invention is to provide an improved boom sprayer, preferably of the telescoping type, with an improved means to mount the sprayer to the support or towing vehicle.

A still further object of the present invention is to provide an improved method of spraying with a boom sprayer.

These and other objects of the present invention become apparent with reference to the drawings, the description of the preferred embodiment and the appended claims.

DESCRIPTION OF THE DRAWINGS

FIG. 3 is a side elevational view, with portions broken away, of the boom assembly with the outer boom in a fully retracted position.

FIG. 4 is a side elevational view comprised of FIGS. 4A and 4B, with portions broken away, of the boom assembly with the outer boom partly extended from the inner boom.

FIG. 5 is a side elevational view comprised of FIGS. 5A and 5B, with portions broken away, of the boom assembly, with the outer boom in a fully extended position.

FIG. 6 is a side elevational view, with portions broken away, of the inner boom as viewed from the opposite side than that shown in FIGS. 3, 4 and 5.

FIG. 19 is a rear elevational view of the means to support the individual spray booms relative to the towing vehicle.

FIG. 20 is an elevational side view of the support mechanism of FIG. 19.

FIG. 23 is a top schematic view of a further embodiment of a means for moving the outer boom between an extended and retracted position relative to the inner boom.

FIG. 24 is an exploded view of a further embodiment of a means for permitting or preventing flow of spray material through nozzles in the outer boom as it moves between its extended and retracted positions.

FIG. 25 is a side elevational view of the embodiment of FIG. 23.

FIG. 26 is a view, partly in section, showing the relationship between the inner and outer spray fluid conduits of the embodiment of FIG. 23.

FIG. 27 is an elevational side view of the embodiment of FIG. 23 incorporated in a telescoping boom system in which the outer boom is in a retracted position.

FIG. 28 is an elevational side view of the embodiment of FIG. 23 incorporated into a telescoping boom system in which the outer boom is in an extended position.

FIG. 29 is an elevational side view showing an alternative means for providing spray fluid to the outer, telescoping boom of the type shown in FIGS. 1–18.

DESCRIPTION OF THE PREFERRED EMBODIMENT

Figure 1:
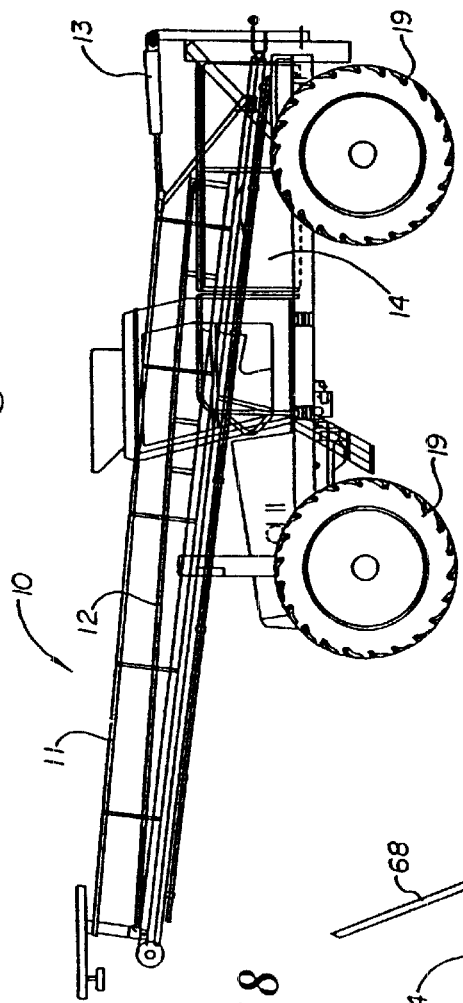
FIG. 1 is an elevational side view of the boom sprayer in accordance with the present invention showing the boom assembly attached to a support vehicle and in a retracted, transport or non-use position.
Figure 2:
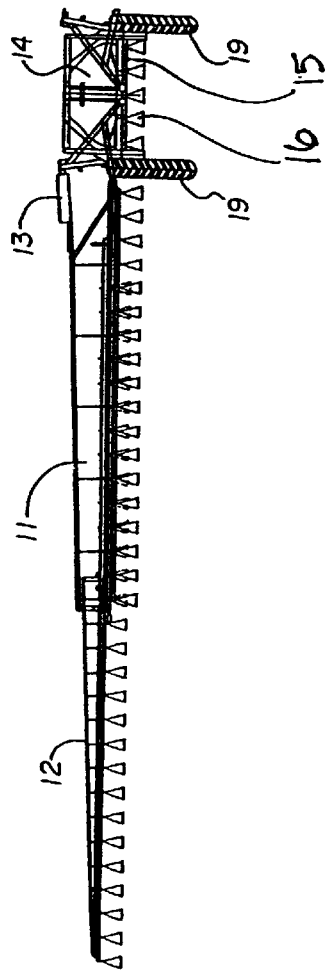
FIG. 2 is an elevational rear view of the boom sprayer in accordance with the present invention showing one of the boom assemblies connected with the support vehicle and in a fully extended, spray position.

The present invention relates to a telescoping boom sprayer designed primarily for agricultural use which can spray variable widths with no spray overlap. The sprayer in accordance with the preferred embodiment is illustrated generally in FIGS. 1 and 2 and more specifically in FIGS. 3, 4 and 5 in various positions of extension and retraction. In general, the boom sprayer 10 of the present invention includes a pair of boom assemblies each comprising a first or inner boom or boom section 11 and a second or outer boom or boom section 12. In the preferred embodiment, the boom 11 is a fixed boom section and the boom 12 is an extendable boom section. FIG. 1 shows the booms 11 and 12 in a fully retracted transport or non-use position mounted to a support or towing vehicle 14. FIG. 2 shows the booms 11 and 12 in a fully extended position relative to the vehicle 14. Only one boom assembly is shown in FIG. 2. In actuality, a second identical boom assembly extends from the opposite side of the vehicle 14 shown in FIG. 2.

The vehicle 14 can, if desired, be a conventional tractor or other vehicle which has been adapted to receive the boom sprayer elements of the present invention or may be a vehicle which is designed for and dedicated solely to the boom sprayer components of the present invention. Preferably, the tractor 14 includes a source of hydraulic fluid power to drive the boom extension motor and the various boom positioning cylinders as described in greater detail below. As shown in FIG. 2, the vehicle 14 also includes a spray conduit 15 extending across the rearward end of the vehicle 14 and a plurality of spray heads 16 positioned in spaced relationship along the conduit 15. A plurality of hydraulic cylinders 13 and 18 and/or other power means are provided for pivoting the boom assemblies about both a generally horizontal axis as well as a generally vertical axis to enable the boom assemblies to be moved between an operative or spray position as shown in FIG. 2 and a folded or transport position as shown in FIG. 1. Such power means is common in the art with respect to boom sprayers and is thus not shown in greater detail. The vehicle 14 includes ground engaging means in the form of a plurality of wheels 19.

Reference is next made to FIGS. 3, 4, 5 and 6 showing the inner boom section 11 and the outer boom section 12 in various stages of extension and retraction from a fully retracted position in FIG. 3 to a fully extended position in FIG. 5. Although the preferred embodiment shows each boom assembly as comprised of an inner boom section 11 and an outer boom section 12, more extendable boom sections can be utilized without departing from the features of the present invention. Such a structure could involve additional extendable boom sections moveable relative to other extendable sections.

The first or inner boom section 11 is an elongated, rigid structure having a longitudinal axis in the direction of its elongation, an inner or proximal end mounted to the vehicle 14 about a generally horizontal axis 20 and an outer or distal free end extending outwardly from the vehicle 14. With continuing reference to FIGS. 3–6 and additional reference to FIGS. 8 and 9, the elongated inner boom 11 is shown to have a generally triangular cross-sectional configuration having a continuous generally cylindrical top frame member 22 positioned at the apex of the triangular configuration and a continuous bottom frame member 26 centrally positioned below the base of the triangular configuration. As shown best in FIGS. 8 and 9, the frame member 26 has a generally square or diamond shaped cross-sectional configuration. The frame member 26 extends throughout the entire length of the boom section 11, while the frame member 22 extends throughout a substantial portion of the length of the boom section 11. The inner end of the frame member 22 may be connected with a hydraulic cylinder 13 (FIGS. 1 and 2) for raising and lowering the boom assembly.

A pair of 90 degree angle irons 28,28 also extend substantially along the entire length of the boom 11 to assist in supporting the outer boom section 12 as will be discussed in greater detail below and to also provide rigidity to the boom section 11. In the preferred embodiment, as shown best in FIGS. 8 and 9, the bottom edges of the angle members 28,28 are rigidly connected to a portion of the top outer surface of the frame member 26 by welding or the like. The configuration of the boom section 11 is braced at its ends and at spaced locations between its ends by a plurality of braces. Specifically, a brace member 23 extends downwardly and inwardly from the inner end of the frame member 22 for connection to the frame member 26. A distal end brace member 21 is positioned at the distal or outer end of the boom section 11. As shown best in FIGS. 7 and 8, the generally triangular configured brace 21 is connected at its top to the frame member 22 and has inner edge portions of its base welded to portions of the angle members 28. A plurality of spaced, intermediate brace members 24 extend downwardly and outwardly from the top frame member 22 and then inwardly for rigid connection by welding or the like to a lower portion of the angle members 28 similar to the brace 21. As shown, the cross-section size of the triangular boom 11 decreases from its inner end adjacent to the tractor 14 to its outer free end. In addition to the braces 21, 23 and 24, the inner boom section 11 may also be braced by one or more braces 29 extending diagonally from the frame member 22 across or to the base of the frame members 24 and rigidly connected thereto.

A spray material supply conduit 42 is mounted to one side of the boom section 11 by a plurality of spaced mounting brackets 44 as shown best in FIGS. 3, 4, 5, 8 and 9. The conduit 42 extends along the entire length of the boom 11 and includes a plurality of spray heads or spray nozzles 45 positioned in spaced relationship along the entire length of the conduit 42 and the boom 11. In the preferred embodiment, these spray heads 45 are not provided with valves. Thus, they are continuously in communication with the interior of the conduit 42 so that spray material provided to the conduit 42 will exit through the spray nozzles 45. It should be noted that if spraying is desired at only the boom section 12 outwardly of the boom section 11, the conduit 42 and nozzles 45 can be eliminated or the spray material valve to the conduit 42 turned off.

Figure 7:
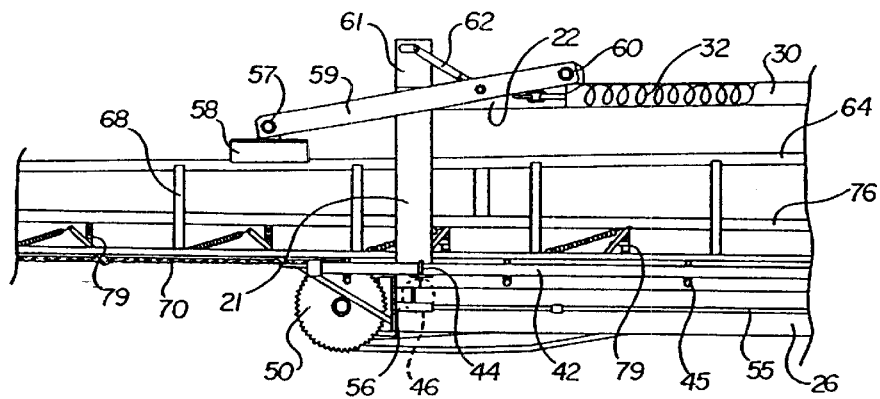
FIG. 7 is an enlarged side elevational view showing the relationship between the inner and outer booms at the outer end of the inner boom.
Figure 8:
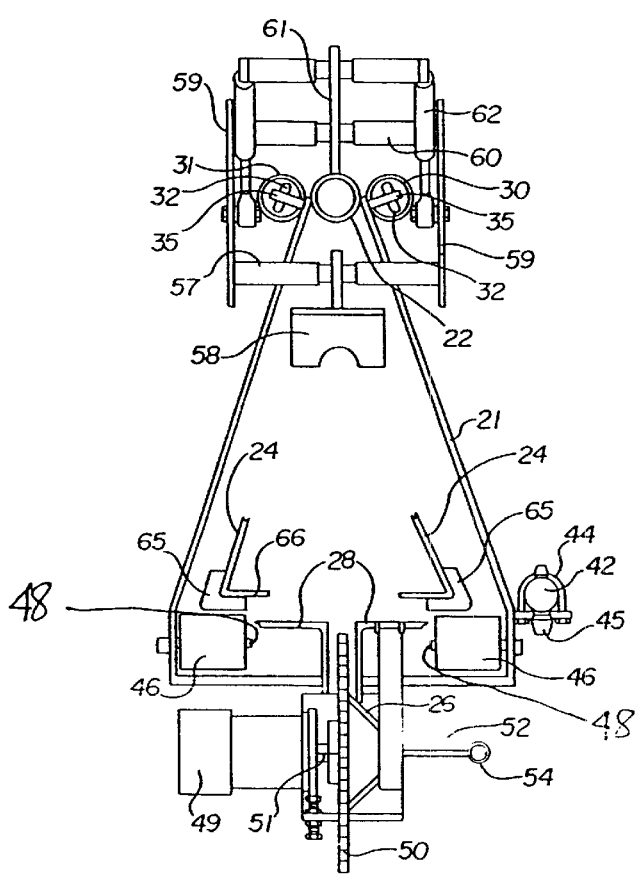
FIG. 8 is an elevational end view of the inner boom, with portions of the outer boom in section, as viewed from the outer end of the inner boom.
Figure 9:
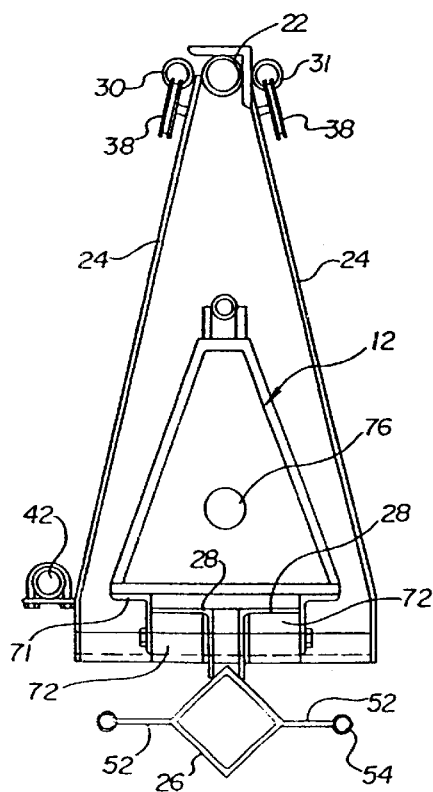
FIG. 9 is an elevational end view of the outer boom, with portions of the inner boom, as viewed from the inner end of the inner boom at the line 9—9 of FIG. 4A.

The means for driving and supporting the boom section 12 for outward and inward movement relative to the boom section 11 includes a pair of boom support rollers 46,46 rotatably supported on a pair of axles 48 as shown best in FIGS. 7 and 8. The axles 48 are connected at the outermost end of the inner boom 11 to the brace member 21 as shown. In the preferred embodiment, the axles 48 are rigidly mounted to lower portions of opposite sides of the brace 21 by threaded members, welding or the like. As will be described in greater detail below with respect to the operation of the boom sprayer, these support rollers 46 function to support the outer boom 12 during its outward and inward movement relative to the inner boom 11.

Mounted outwardly of the brace 21 of the boom 11 is the drive means for driving the outer conveyor 12. In the preferred embodiment, this means includes the hydraulic motor 49 and a directly driven toothed drive sprocket 50. The sprocket 50 is directly mounted on a shaft 51 of the motor 49 and is centrally positioned between the inwardly facing surfaces of the angle members 28 as shown in FIG. 8. The hydraulic motor 49 is driven by a source of hydraulic fluid power from the vehicle 14. A plurality of fluid lines 25 extend from the power source to the motor 49. Sufficient lines and connections are needed to selectively drive the motor 49 in both a forward and a reverse direction.

With continuing reference to FIGS. 3–5, 8 and 9, a plurality of cable guide or standoff members 52 are rigidly secured to opposite sides of the bottom frame member 26. The standoffs 52 include eyelets 54 at their outer ends to receive a stabilizing and support cable 55. A cable 55 is positioned on each side of the frame member 26. One end of the cable 55 is connected to and extends from an innermost end of the boom 11, while the other end of the cable 55 extends and is connected to the outermost end of the boom section 11 at the connector 56 (FIG. 7). The cables 55 function primarily to dampen vibration of the boom section 11 in a lateral direction.

The outermost end of the boom section 11 includes means in the form of the outer boom holdown means. As shown best in FIGS. 7 and 8, this means includes the member 58 which is pivotally connected at the axis 57 between a pair of spaced holdown arms 59. The other ends of the arms 59 are rotatably supported relative to the main frame of the boom 11 about the pivot 60. A pair of pressurized cylinders 62 are pivotally mounted at one of their ends to the arms 59 at a point between the pivots 57 and 60, with their other ends pivotally connected to a bracket extension 61 of the rearward brace member 21. With this structure, a force is exerted downwardly against the arms 59 by the air cylinders 62, thereby exerting a corresponding downward force on the holdown member 58. This holdown force is exerted against the top 64 of the outer boom section 12 to stabilize the boom 12 and to maintain the same in driving relationship relative to the drive sprocket 50.

Figure 10:
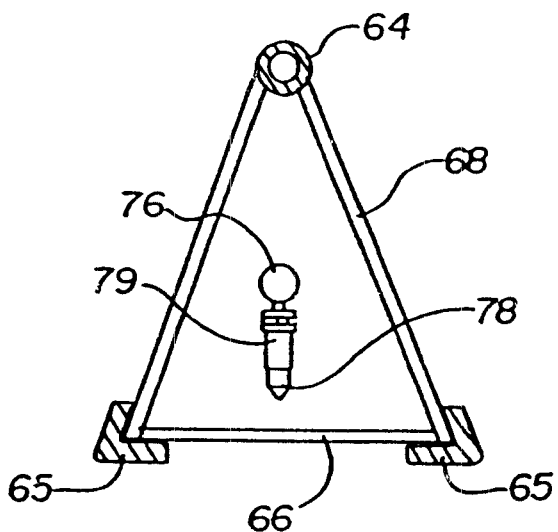
FIG. 10 is a view, partially in section, of the outer boom as viewed along the line 10—10 of FIG. 5B.
Figure 11:
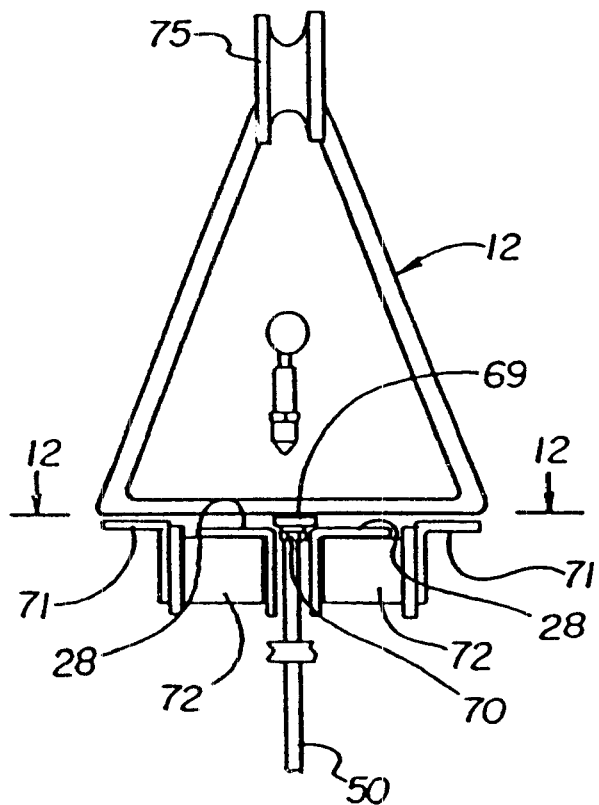
FIG. 11 is an elevational end view of the outer boom and portions of the drive and roller support members of the inner boom.

The structure of the outer boom is illustrated best in FIGS. 3, 4 and 5 as well as FIGS. 10 and 11. Similar to the boom section 11, the outer boom section 12 is an elongated, rigid structure comprised of a plurality of rigid elongated frame members including a top frame member 64 and a pair of bottom corner frame members 65,65. Both the top frame member 64 and the corner frame members 65,65 extend generally along the entire length of the boom section 12. A plurality of bottom, laterally extending brace members 66 and a plurality of side brace members 68 are spaced longitudinally along the boom section 12 and are connected to the top frame member 64 and the bottom corner frame members 65 by welding or the like.

Both the inner boom 11 and outer boom 12 may be constructed of any material rigid and strong enough to withstand the stresses in the booms such as steel or aluminum, among possible others. As illustrated best in FIGS. 10, 11 and 12, a drive chain support member 69 also extends substantially throughout the entire length of the boom section 12 and is rigidly secured to the bottom surfaces of the spaced, laterally extending brace members 66. The support member 69 is centrally positioned between the corner frames 65,65. A length of roller chain 70 is secured to the bottom of the member 69 as shown by welding or the like. During operation, the roller chain 70 is engaged by the teeth of the toothed sprocket 50 to drive and move the boom section 12 between its extended and retracted positions.

Figure 18:
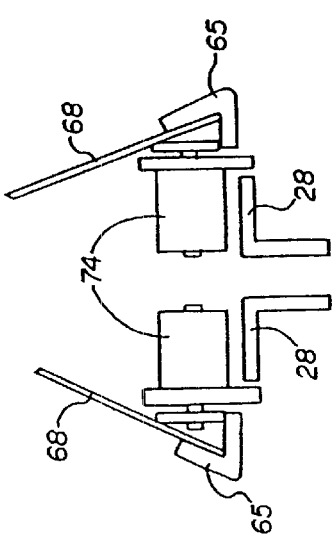
FIG. 18 is a view, partially in section, as viewed along the section line 18—18 of FIG. 4A.
Figure 12:
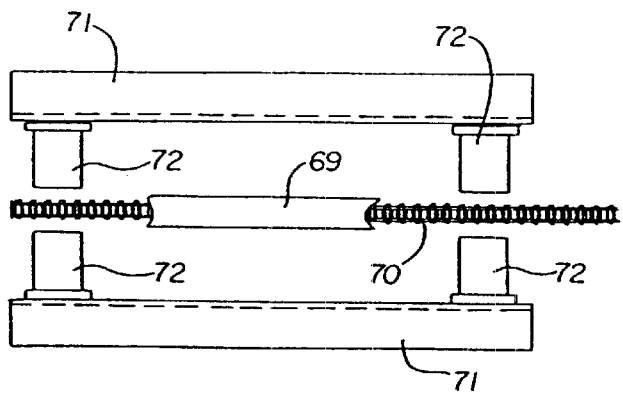
FIG. 12 is a view of the inner end of the outer boom as viewed along the line 12—12 of FIG. 11, with portions broken away.

The forwardmost or innermost end of the outer boom section 12 is provided with a boom support carriage means illustrated best in FIGS. 11 and 12 and also in FIG. 4. The support carriage includes a pair of outer angle iron members 71,71. The top surfaces of the angle members 71,71 are rigidly secured to the bottom surfaces of the corner members 65,65 as shown best in FIGS. 10 and 11. Two pairs of support rollers 72 are rotatably supported to the inner facing surfaces of the angle members 71,71. These rollers 72 are supported on axles rigidly secured to the frame members 71,71. As shown in FIG. 11, the rollers 72 are designed to contact the bottom surface of the angle members 28,28 of the inner boom 11 in rolling engagement as the boom section 12 moves inwardly and outwardly relative to the boom section 11. As shown in FIGS. 4A and 18, a further pair of support rollers 74 is rotatably connected near the inner end of the boom section 12 to support the innermost end of the boom section 12 as it is retracted toward its innermost position. Specifically, as more of the weight of the boom section 12 is positioned inwardly of the support rollers 46 (FIG. 7), the inner end of the boom section 12 will be supported by the rollers 74 in engagement with the top surfaces of the angle members 28. In the preferred embodiment, the rollers 72 as well as the rollers 74 are flanged rollers to assist in guiding the boom section 12 during its extension and retraction movement.

A rotatable pulley member 75 is mounted to the inner end of the frame member 64 to assist in supporting the flexible hose 83 as the boom section 12 moves inwardly toward its innermost position. The pulley 75 is rotatably supported relative to the frame member 64 via a pulley mounting bracket 73.

Figure 13:
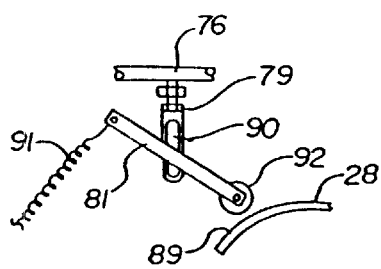
FIGS. 13, 14 and 15 are elevational side views of the spray head assemblies associated with the outer boom showing the spray head valve opening sequence, with FIG. 13 showing the valve in a closed position, FIG. 14 showing the valve midway between open and closed positions and FIG. 15 showing the valve in an open position.
Figure 14:
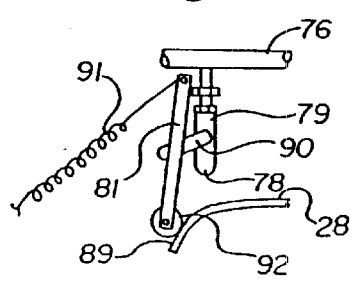
Figure 15:
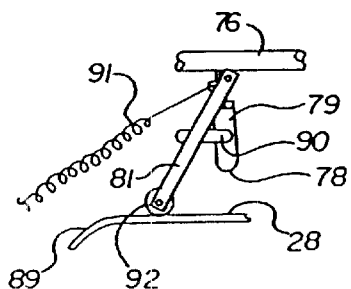
Figure 16:
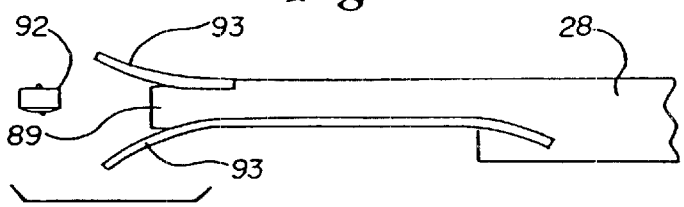
FIG. 16 is an elevational plan view showing a guide ramp for the valve follower member.
Figure 17:
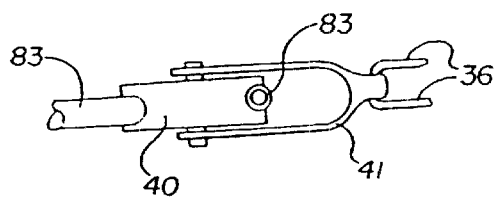
FIG. 17 is a view, partially in section, as viewed along the section line 17—17 of FIG. 4A.

Supported within the boom section 12 and along its entire length is a spray material supply conduit section 76. Positioned in spaced relationship along the length of the conduit section 76 are a plurality of spray heads or spray head assemblies comprising an "on-off" valve 79 and a spray nozzle 78. As illustrated best in FIG. 7 and in FIGS. 13, 14 and 15, each of the valves 79 includes an actuating link comprising the link members 81 and 90. The members 81 and 90 are connected with the valve 79 and function to move the valve 79 between an "on" or "spray" position allowing spray fluid to flow from the conduit 76 to the spray nozzles 78 and an "off" or "non-spray" position preventing the flow of spray fluid through the valve 79. Specifically, the short link member 90 has one end connected to a pivot member of the valve 79 and its other end rigidly secured centrally to the elongated link member 81 as shown. The link member 81 includes a roller or slide member 92 at one end for rolling or sliding engagement with the top surface of the angle member 28 (FIGS. 13–16 and FIG. 8). If desired, the outermost end of the top surface of the frame member 28 can be provided with a ramp or lead in surface 89 as shown in FIGS. 13–15. Guide or lead-in surfaces 93 (FIG. 16) may also be provided for guiding the roller or slide member 92 into engagement with the member 28. The opposite end of the link member 81 is connected with one end of an extension spring 91. The other end of the spring 91 is connected with a frame portion of the boom 12.

Operation of the valve 79 can best be understood by reference to FIGS. 13–15. FIG. 13 illustrates the valve 79 in an "on" position which allows flow of spray fluid from the conduit 76 to the spray nozzle 78. The valve 79 is biased in this position by the spring 91 and is in this "on" position whenever the valve 79 is positioned outwardly of the end of the frame member 21, and thus the outermost end of the boom section 11. FIG. 14 illustrates the valve 79 midway between on and off positions. As the boom section 12, and thus the valve 75, moves toward the right as viewed in FIG. 14, the member 92 begins to engage the ramp surface 89 against the force of the spring 91 and begins to rotate the link members 80 and 81 in a clockwise direction to close the valve 79. Further movement of the boom section 12, and thus the valve 79 toward the right as shown in FIG. 15, completely closes the valve against the force of the spring 91. The valve 79 will remain in this closed position until this particular valve is moved outwardly beyond the outermost end of the member 21 and thus the boom section 11.

It is contemplated that a variety of types of valves could function in the spray head assemblies of the present invention; however, the valves of the preferred embodiment are quarter (¼) turn "on-off" valves. It is also contemplated that a variety of other valve-actuation means could be utilized to selectively move the valves 79 from an "on" to an "off" position as a particular valve moves inwardly past a particular point and from an "off" to an "on" position as a particular valve moves outwardly past a particular point. Such means may include mechanical means such as that disclosed in the preferred embodiment or cam or other means. Such means may alto utilize valves which are actuated via an electronic, magnetic or similar signal means. In the preferred embodiment, the spray head at the outermost end of the boom section 12 does not include a valve and thus is always in an "on" position.

The means for providing spray fluid to the spray conduit 42 of the boom section 11 and to the spray conduit 76 of the boom section 12 is illustrated best in FIGS. 3, 4 and 5. This means includes a spray supply conduit assembly including a first conduit section 80 having an innermost end 77 connected with a supply of spray fluid carried by the vehicle 14 (FIGS. 1 and 2) and an outer end connected to a distribution tee 82. The conduit section 80 may be rigid or flexible, but preferably is a flexible hose. One outlet of the tee 82 is connected to the valve 84 which is in turn connected with the supply conduit 42 for the spray heads 45 of the boom section 11. The valve 84 is a conventional electrically controlled valve and includes a control box 85. The other outlet of the tee 82 is connected with the valve 86 for connection to a second section 83 of the spray fluid supply conduit. Like the valve 84, the valve 86 is electrically controlled and includes a control box 87. The second conduit section 83 has one end connected to the valve 86 and the other end connected to the spray supply conduit 76 of the boom section 12 for supply to the spray head valves 79. Preferably the conduit section 83 is comprised of a flexible hose. Accordingly, the spray material supply conduit includes a first portion 80 extending from the inner end of the boom 11, a central portion comprised of the tee 82 and the valves 84 and 86 connected to the boom 11 near its midpoint, and a second or outer portion 83 extending from the central portion to the conduit 76 to supply the spray heads to the boom 12.

As shown best in FIGS. 3–5, the portion of the conduit section 83 between the ends of the section 83 is supported by a hose or conduit support means which includes the spring biased pulley member 40. The pulley 40 is rotatably supported between bifurcated portions of the pulley mounting bracket 41 and is biased inwardly in a direction toward the vehicle by the cables 36 and a pair of extension springs 32 (FIGS. 3–7). A pair of extension spring housings 30 and 31 (FIGS. 8 and 9) are rigidly secured to opposite sides of the apex frame member 22. These housings 30 and 31 house the pair of extension springs 32 which have one of their ends connected to a bracket 35 at the outer ends of the housings 31 and 32. The other ends of the springs 32 are connected to the cables 36 at a point within the housings 30 and 31. Each of the cables 36 extends from the inner end of one of the springs 32 within the housings 30 and 31 around a first pulley 38 mounted to one of the frame members 24, and then around a second pulley 39 rigidly secured to the frame member 23 and then to the rotatable member 40 via the bracket 41.

In FIG. 5, the boom section 12 is in its outermost extended position. As the boom section 12 is moved inwardly relative to the boom section 11, the pulley member 40 moves inwardly as well pulling the flexible hose 83 along with it. As the innermost end of the boom section 12 reaches the point at which the hose 83 is connected with the valve 86, the guide pulley 75 on the end of the boom 12 will begin to engage the hose 83 and assist in supporting the same as the boom 12 continues its inward movement.

Having described the structure of the preferred embodiment in detail, the operation and method of the boom sprayer of the present invention can be understood best as follows.

First, when not in use, or during transport, the boom sprayer is fully retracted and pivoted inwardly to the position illustrated in FIG. 1. To operate the boom sprayer of the present invention for spraying an agricultural crop or the like, the boom assemblies comprising the boom sections 11 and 12 on each side of vehicle 14 are pivoted outwardly and lowered to a desired height above the crop by the hydraulic cylinder 13 and power means 18 to a position similar to that illustrated in FIG. 2, except for the outer boom section 12 still being retracted as illustrated in FIG. 3. In this position, the pulley 40 and cable 36 are fully retracted as a result of the force exerted by the extension springs 32 (FIG. 7) and the flexible spray supply hose 83 extends from the innermost end of the spray supply conduit 76, around the pulley 45, over the guide pulley 75 and to the outlet end of the valve 86. When in this retracted position, each of the spray head valves 79 is in an "off" or non-spray position with the actuation roller or slide 92 engaged with the top surface of the member 28 as shown in FIG. 15. In this position, the boom section 11 is fully operable as a boom sprayer to spray at a width defined by the combined lengths of the boom sections 11. To function in this manner, the valve 86 is moved to an off position via an appropriate signal to the valve control 87 and the valve 84 leading to the supply conduit 42 is opened via an appropriate signal to the valve control 85. Spray fluid is then allowed to flow through the supply hose 80 through the valve 84 and into the conduit 42 for exit through the plurality of spray nozzles 45 along the length of the boom section 11.

If it is desired to spray a greater width, the boom drive motor 49 (FIG. 8) is actuated by hydraulic power to rotate the drive sprocket 50 in a counterclockwise direction as viewed in FIG. 7. Because of engagement between the teeth of the sprocket 50 and the roller chain 70 connected with the boom section 12, the boom section 12 is moved outwardly toward the left as viewed in FIGS. 3, 4 and 5. During this movement, the boom section 12 is supported in rolling engagement relative to the boom section 11 via the rollers 46 (FIG. 8) engaging the lower surface of the corner frame members 65 and via the rollers 72 or 74 (FIGS. 10, 11, 12 and 18) engaging the bottom or top surface of the angle members 28.

Outward movement of the boom section 12 to an intermediate extended position such as that shown in FIG. 4 results in a portion of the boom section 12 extending outwardly from the outer end of the boom section 11. As shown best in FIG. 4B, those spray head valves 79 which are positioned outwardly of the outer end of the boom section 11 are in an "on" or spray position similar to that shown in FIG. 13, while those spray head valves 79 positioned inwardly of the outer end remain in an "off" or non-spray position. As the conveyor section 12 moves toward an extended position, the pulley 40 moves toward the left against the force of the springs 32 in the spring housings 30 and 31 (FIG. 7.

If further spraying width is desired, the motor 49 is further actuated to rotate the sprocket 50 and thus move the boom section 12 further outwardly to a maximum extension as shown in FIG. 5. In this view, the boom section 12 is completely extended from the boom section 11 with all of its spray head valves 79 switched to an "on" or spray position. In this position, the pulley 40 is moved further toward the left against the force of the springs 32 in the spring housings 30, 31 (FIG. 7). During this entire movement of the boom section 12 from the fully retracted position of FIG. 3 to the fully extended position of FIG. 5, the holdown mechanism comprised of the holdown member 58, the arms 59 and the cylinders 62 exert a downward force against the top frame member 22 of the boom section 12 to assist in maintaining driving connection between the teeth of the sprocket 50 and the chain 70 and to stabilize the boom section 12 relative to the boom section 11.

To retract the boom section 12 from the position shown in FIG. 5 to that shown in FIG. 3, the above process is reversed. During this movement, rotation of the hydraulic motor 45 and thus drive sprocket 50 is reversed to move the boom section 12 inwardly. As the roller or slide members 82 of the spray head valves 79 engage the surfaces 85 and 28 (FIGS. 13–16), the valves 79 are moved to an "off" position as they pass the outer end of the boom section 11. As the inwardmost end of the boom section 12 moves inwardly, the hose guide roller 75 will ultimately engage a portion of the supply hose 83 to assist in supporting the same during further inward movement. After the boom section 12 has been fully retracted to the position illustrated in FIG. 3, the boom assembly can be pivoted upwardly and inwardly relative to the vehicle 14 to a non-operative or transport position as shown in FIG. 1.

The spray booms in accordance with the present invention as described above can be connected to the support or towing vehicle 14 in a variety of ways. Preferably, in accordance with the present invention, the spray booms are mounted in such a way that the booms are both self leveling as well as being capable of independent actuation. More specifically, as shown in FIGS. 19 and 20, the spray boom assembly 95 includes a support member or pendulum 96 which is pivotally secured to the frame of the towing vehicle at the pivot 102. The assembly also includes a pair of parallel lift linkages 104 and 105 for raising and lowering the individual spray booms on each side of the vehicle.

More specifically, the support member 96 includes a top frame member 98, a center frame member 99, a pair of side frame members 100 and a pair of bottom frame members 101. The frame members 98, 99, 100 and 101 are rigidly connected with one another to form the rigid support member 96, with the entire structure being pivotally connected to the vehicle frame at the point 102. In the preferred embodiment, the pivot point 102 is a pivot shaft rigidly connected with the bracket 103 which is in turn rigidly secured to the vehicle frame. The pivot shaft extends through the pivot sleeve 106 which is rigidly secured to the top edge of the frame member 98. To assist in stabilizing the pivotal or pendulum movement of the support member 96 about the pivot 102, a pair of shock absorbers 108,108 are connected between a portion of the bottom frame members 101 and a respective bracket 109 rigidly connected with the vehicle frame. If further stabilization is desired such as for longer booms, a second pair of shock absorbers 110,110 are provided between ends of the bracket 103 and respective brackets 111 rigidly secured to the top frame member 98. With this construction, the shock absorbers 108 and 110 function to stabilize and dampen the pivotal or pendulum movement of the frame member 96 relative to the towing vehicle. Although a variety of shock absorbing cylinders or other means may be utilized, the shock absorbers 108 and 110 are conventional automotive air cylinder shock absorbers.

Each of the parallel linkages 104 and 105 includes a pair of parallel links 112 and 114 and a side link 115. As shown, the inner ends of each of the parallel links 112 and 114 are pivotally connected to the center frame member 99 at the pivots 116 and 118, respectively. The opposite ends of the links 112 and 114 are pivotally connected to the side link 115 at the pivots 119 and 120.

The lift linkages or lift link assemblies 104 and 105 are further mounted relative to the support member 96 through the pair of cylinder mounting brackets 121 rigidly secured to the top frame member 98, the bracket 122 rigidly secured to the side link 115 and the lift cylinder 124 connected between the brackets 121 and 122. Accordingly, as the lift cylinders 124 of the link assemblies 104 and 105 are extended and retracted, their respective link assemblies are lowered and raised relative to the support member 96. Rigidly secured to the top and bottom ends of the side link 115 are boom mounting brackets 125 and 126, respectively, for mounting the inner ends of the booms in a conventional manner. A pneumatic cylinder 128 is connected between a portion of the link 114 and an outer end of the bracket 126 to selectively pivot the bracket 126 and thus the entire boom between a retracted and extended position.

As shown best in FIG. 20, the brackets 109 include an opening 107 through which the bottom frame members 101 extend. As also illustrated best in FIG. 20, the links 112 and 114 are comprised of a pair of links which are laterally spaced and connected by pins or bolts defining the pivots 116, 118, 119 and 120. Attached to a surface of the innermost one of the links 112 is a stop member 129 which is designed for engagement with the stop bracket 130 when the respective linkage assemblies 104 and 105 reach their uppermost position relative to the vehicle frame. The stop bracket 130 is rigidly secured to the bracket 131 which is in turn rigidly secured to the vehicle frame. This mechanical stop essentially disables the pendulum action of the support member 96 when one of the booms is fully up or in the rack. This enables the other boom to be operated independently. The mechanism shown in FIGS. 19 and 20 and described above can be used to support spray booms, whether they are telescoping or not.

Figure 21:
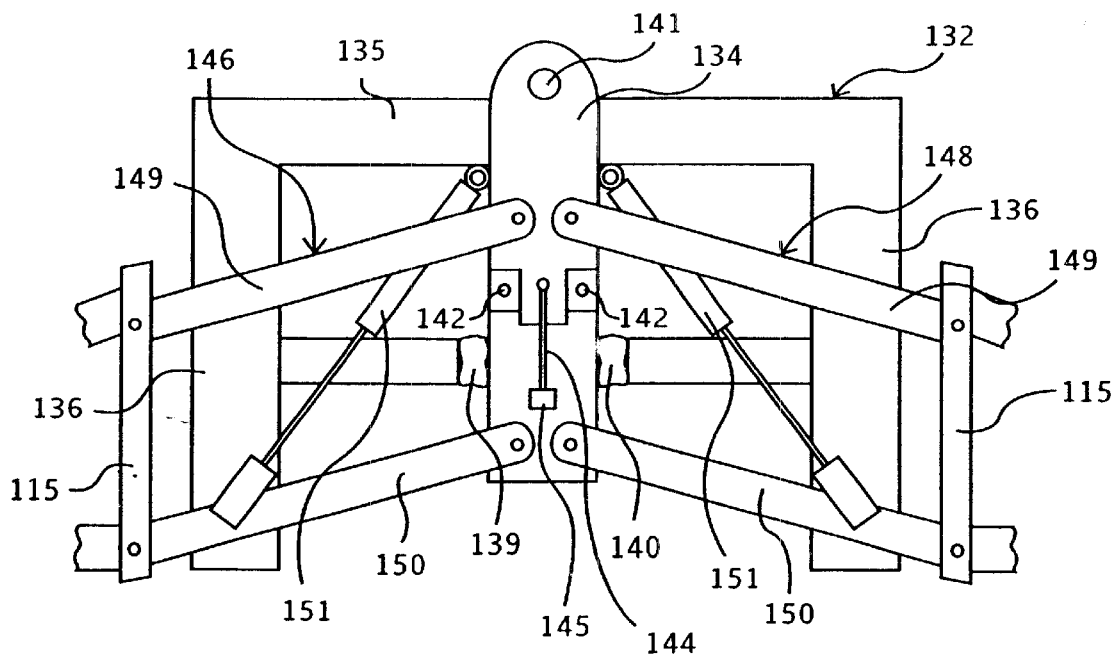
FIG. 21 is a rear elevational view of a further embodiment of a means to support the individual spray booms relative to the support vehicle.
Figure 22:
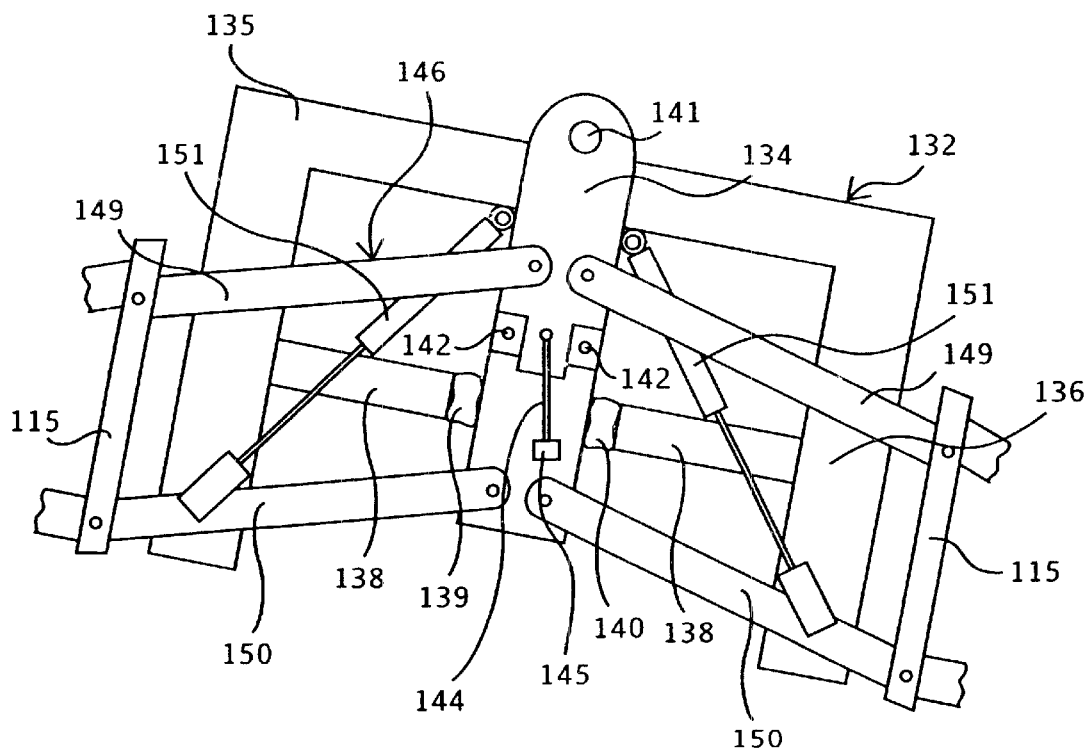
FIG. 22 is a view similar to FIG. 21, but with the vehicle tilted toward the right.

A further embodiment of a structure for mounting the spray booms to the rear of the towing vehicle is shown in FIGS. 21 and 22. The structure includes a rigid frame member 132 and a pivotable frame or support member 134. The frame member 132 is rigidly mounted to the towing vehicle and includes a top horizontally-positioned member 135, a pair of generally vertically-oriented legs 136, 136 and a pair of generally horizontally-disposed, inwardly-extending legs 138, 138. In the preferred embodiment, the frame members 135, 136 and 138 are rigidly connected with one another, with the legs 136, 136 extending downwardly from the outer ends of the horizontal frame member 135 and the frame members 138, 138 extending inwardly, respectively, from an inner surface of the legs 136. Positioned at the inner ends of the frame members 138, 138 are actuation or stabilizing members in the form of inflatable and deflatable air bags 139 and 140.

The frame member or support member 134 extends generally vertically as shown and is pivotally connected near its top end to the towing vehicle frame about the pivot point 141. The frame member 134 is designed for limited clockwise and counterclockwise pivotal movement about the pivot point 141, which movement is limited and stabilized by the frame members 138, 138 and the air bags 139 and 140. Specifically, as shown, one of the air bags 139 and 140 is positioned between an inner end of each of the frame members 138, 138 and a side of the frame member 134.

Associated with the air bags 139 and 140 are air control valves 142 whose operation is controlled by the position of a weighted pendulum 144 having a weighted end 145. Depending upon the relative position of the pendulum 144, compressed air is directed into one of the air bags 139 and 140 and deflated from the other. The air bag stabilizing mechanism is designed primarily to assist gravity to maintain the booms parallel to the ground, to maintain stability and to provide self leveling to and remove stress from the booms when the vehicle is turned. For example, because of the length of the booms in their extended position, and the momentum of the moving vehicle, even a slight turn of the vehicle will have a tendency to cause the end of the boom to the outside of the turn to dig into the ground. The mechanism of the present invention will compensate for this to keep the boom structure level with the ground.

Specifically, if the towing vehicle and the rigidly connected frame member 132 as shown in FIG. 22, or just the frame member 132 (and thus the booms), tilt to the right as a result of a turn to the left, the pendulum 144 will tend, by gravity, to remain in the position shown (vertically downwardly) which is displaced slightly counterclockwise relative to the frame member 134. This relative rotation of the pendulum 144 triggers the air control valves 142 and causes the air simultaneously to be dumped from the air bag 140 and to fill the air bag 139. This causes the spray booms to tilt back against the momentum tending to cause the outside boom to dig into the ground and to remain substantially parallel to the ground.

The combination of the air bags 139 and 140 and the air valves 142 comprise elements known in the art. In the preferred embodiment, such air bags and air control valves are readily available as valve leveling air bags or in air bag leveling kits. These are readily available at automotive supply stores. Appropriate tubing and other means provide a source of air to the air valves 142 and thus to the air bags 139 and 140. Actuation or stabilizing means other than the air bags 139 and 140 may also be used to stabilize the frame member 134, and thus the booms, and to keep the booms in a desired position relative to the ground.

As shown in FIGS. 21 and 22, the spray booms 115 on each side of the vehicle are supported by a pair of lift link assemblies 146 and 148. Each of these lift assemblies includes a top link member 149 and a bottom link member 150. Each of the top and bottom link members 149 and 150 includes an inner end pivotally connected to the frame member 134 and an outer end pivotally connected to its respective boom 115. Lift cylinders or rams 151 are provided between a portion of the frame member 134 and its respective lower link 150 for the purpose of raising and lowering the boom assemblies 115. With this mechanism, the lift link assemblies 146 and 148 are raised and lowered relative to the vehicle and the member 134.

FIG. 23 shows a further means for moving the outer boom 12 outwardly and inwardly relative to the inner boom 11. This means includes a link chain 180 extending around a driven sprocket 181 and an idler sprocket 182. The outer boom 12 is connected to the chain 180 via the connection link 184. Thus, rotation of the sprocket 181 via a hydraulic motor or the like causes movement of the chain 180 and corresponding movement of the outer boom 12.

A further means for selectively permitting and preventing spray material flow to nozzles in the outer boom as the outer boom moves outwardly and inwardly between retracted and extended positions is shown in FIGS. 24–28. This embodiment includes an elongated inner spray fluid conduit or tube 152 rigidly connected with the inner boom 11 and an elongated outer spray fluid conduit or tube 156 rigidly connected to the telescoping outer boom 12. The inner tube 152 is hollow and includes an inner spray material supply end 154 and an outer seal assembly end 155. The outer tube 156 includes an inner open end 158, an outer closed end 159 and a plurality of spray nozzles 160 spaced along the length of the tube 156. During operation, the seal assembly end 155 of the tube 152 is positioned within the interior of the tube 156 through the open end 158. Depending upon the relative position (extension/retraction) of the outer boom 12 relative to the inner boom 11 and thus the position of the seal assembly 155 along the length of the tube 156, the spray nozzles 160 will either be in communication with, or not in communication with, pressurized spray material supplied through the supply end 154 and ultimately into the interior of the tube 156.

With reference to FIG. 26, the seal assembly end 155 includes a seal assembly comprising a seal between the outer surface of the inner tube 152 and the inner surface of the outer tube 156. The seal assembly includes a pipe nipple section 161 which is securely connected to the outer end of the tube 152 by any appropriate means such as welding or the like. The nipple section 161 is generally cylindrically-shaped and has an internal diameter approximating that of the internal diameter of the tube 152. The nipple 161 is threaded at each of its ends, with such threads receiving internally-threaded nuts 162, 162. Positioned between the nuts 162, 162 and on the exterior surface of the nipple 161 is a sleeve member 164. The sleeve 164 is provided with a circumferential groove 165 to seat the O-ring 166. As shown best in FIGS. 24 and 25, the O-ring 166 engages the interior surface of the tube 156 in sealing relationship as the tubes 152 and 156 move relative to one another.

Preferably, both the tube 152 and the tube 156 are constructed of stainless steel, however, such tubes can be constructed of plastic or any other material that is capable of withstanding the corrosive nature of the spray material. Further, the respective sizes or diameters of the tubes 152 and 156 can vary, however, the outer diameter or dimension of the tube 152 must be less than the inner diameter or dimension of the tube 156. This allows the tube 152 to be inserted into the open end 158 of the tube 156 and to move longitudinally, in sealing relationship, within the tube 156 along its entire length. The tubes 152 and 156 can be of various cross-sectional configurations, however, they are preferably of circular cross-sections. Preferably, the outer diameter of the tube 152 is 1¼ inches, while the inner diameter of the tube 156 is 1½ inches.

The open end 158 of the tube 156 is provided with a dust seal member 168. This member 168 is retained relative to an end of the tube 156 by a plastic seal nut 169. When installed, the seal member 168 engages the outer surface of the tube 152 to prevent dust, dirt and other contaminants from entering the interior of the tube 156.

FIGS. 27 and 28 show the embodiment of FIGS. 24–26 mounted relative to an inner boom 11 and an outer boom 12. Specifically, the spray material supply end 154 of the inner boom 152 is connected in a fixed position relative to the inner boom 11, with the seal assembly end 155 being a free end. In contrast, the tube 156 is rigidly secured to the outer boom 12 by a plurality of U-bolts or other connection members. Thus, when the seal assembly end 155 is inserted into the open end 158 of the tube 156, the rigidly supported tube 156 supports the free end or seal assembly end of 155 as the outer boom 12 extends and retracts during operation. As shown best in FIG. 25, the position of the seal assembly end 155 within the tube 156, is dependent upon the extent to which the outer boom is extended or retracted. In FIG. 25, the spray heads 160 to the left hand side of the seal assembly end 155 would not be activated, while the spray heads 160 to the right-hand side of the seal assembly end 155 would.

The spray heads 160 can comprise any form of spray heads. Preferably, the spray heads 160 used in this embodiment are spray heads manufactured and sold by Wilger Industries which are clamped over a 3/16 inch or similarly-sized hole in the tube 156.

FIG. 29 shows an alternate means for activating and deactivating spray heads in the outer boom 12 so that spray heads that are positioned past the outer end of the inner boom 11 are activated or permit flow of spray material, while spray heads inside of the outer end of the inner boom 11 are deactivated or prevent the flow of spray material. In the embodiment of FIG. 8, the mechanical valves of the embodiments of FIGS. 1–18 are replaced by electric valves 173 which are electronically controlled. In this embodiment, the valves 173 are electronically controlled by a potentiometer 177 positioned at the end of the inner boom 11 which is calibrated to measure the boom extension length and thus activate those valves and spray heads that are outside of the outer end of the inner boom 11.

Further, in the embodiment of FIG. 28, an alternate means is disclosed for providing spray fluid to the outer boom 12 as it extends and retracts. This means includes the hose reel 172 rotatably connected with respect to the inner boom 11 at the inner end. The hose reel 172 includes a supply of flexible hose 174 which rotates to provide spray material to the spray nozzles of the outer boom 12 as it extends and retracts. The hose reel 172 further includes a supply hose section 175 extending from the hose reel to the supply of spray material.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

What is claimed is:

1. A boom sprayer comprising:
   a support member pivotally connected to a support vehicle;
   a pair of boom lift members pivotally secured to said support member, each of said lift members being independently and selectively movable between a raised position and a lowered position;
   a first spray boom connected with one of said lift members for movement between a raised and lowered position; and
   a second elongated spray boom connected with the other of said lift members for movement between a raised and lowered position.

2. The boom sprayer of claim 1 including stabilizing means between said support member and the vehicle frame.

3. The boom sprayer of claim 2 wherein said stabilizing means comprise a pair of shock absorbers.

4. A boom sprayer comprising:
   a support member pivotally connected to a support vehicle;
   a pair of boom lift members pivotally secured to said support member, each of said lift members being independently and selectively movable between a raised position and a lowered position;
   a first spray boom connected with one of said lift members for movement between a raised and lowered position; and
   a second elongated spray boom connected with the other of said lift members for movement between a raised and lowered position; and
   stabilizing means between said support member and the vehicle frame wherein said stabilizing means comprises a pair of air bags.

5. A boom sprayer comprising:
   a frame member pivotally connected to a support vehicle;
   a pair of boom lift members pivotally secured to said support member, each of said lift members being independently and selectively movable between a raised position and a lowered position;
   a first spray boom connected with one of said lift members for movement between a raised and lowered position; and
   a second elongated spray boom connected with the other of said lift members for movement between a raised and lowered position wherein each of said lift members comprises a parallel linkage lift member.

6. A boom sprayer comprising:
   a frame member pivotally connected to a support vehicle;
   a pair of boom lift members pivotally secured to said support member, each of said lift members being independently and selectively movable between a raised position and a lowered position;
   a first spray boom connected with one of said lift members for movement between a raised and lowered position; and
   a second elongated spray boom connected with the other of said lift members for movement between a raised and lowered position; and
   a first stop member rigidly secured to each of said lift members and a second stop member rigidly secured to the vehicle frame, said first stop member of each of said lift members being engageable with its corresponding second stop member to limit the upward movement of said respective lift member.

7. A boom sprayer comprising:
   a frame member pivotally connected to a support vehicle;
   a pair of boom lift members pivotally secured to said support member, each of said lift members being independently and selectively movable between a raised position and a lowered position;
   a first spray boom connected with one of said lift members for movement between a raised and lowered position; and
   a second elongated spray boom connected with the other of said lift members for movement between a raised and lowered position wherein said frame member is adapted for limited pivotal movement about a pivot member mounted to said support vehicle and wherein said pivot member is positioned vertically above the point at which said pair of boom lift members are pivotally secured to said support member.

8. A boom sprayer comprising:
   a frame member pivotally connected to a support vehicle;
   a pair of boom lift members pivotally secured to said support member, each of said lift members being independently and selectively movable between a raised position and a lowered position;

a first spray boom connected with one of said lift members for movement between a raised and lowered position; and a second elongated spray boom connected with the other of said lift members for movement between a raised and lowered position; and a stabilizing assembly positioned between said support vehicle and said frame member to limit pivotal movement of said frame member in both a clockwise and a counterclockwise direction.

9. The boom sprayer of claim 8 wherein said stabilizing assembly includes a pair of selectively actuatable air bags.

10. The boom sprayer of claim 9 including a pair of air control valves associated respectively with said pair of selectively inflatable and deflatable air bags.

11. The boom sprayer of claim 10 including an air control member comprising a weighted pendulum.

12. A boom sprayer comprising:

a first elongated boom having an inner end, an outer end and a longitudinal axis;

a second elongated boom moveable outwardly and inwardly relative to said first boom in a direction generally parallel to said longitudinal axis;

a first spray fluid conduit fixed relative to said first elongated boom and having an inner end, an outer end and an outer surface with outer dimension;

a second spray fluid conduit connected to and moveable with said second elongated boom and having an inner open end, an outer closed end and an inner surface with an inner dimension;

a plurality of spray nozzles positioned along said second elongated boom;

said first spray fluid conduit outer dimension being less than said second spray fluid conduit inner dimension and said outer end of said first spray fluid conduit extending into said inner, open end of said second spray fluid conduit; and a seal between said inner surface and said outer surface.

13. The boom sprayer of claim 12 wherein said seal is positioned near the outer end of said first spray fluid conduit.

14. The boom sprayer of claim 12 wherein said first and second spray fluid conduits are circular in cross-sectional configuration.

15. The boom sprayer of claim 12 wherein said inner end of said first spray fluid conduit is supported near the inner end of said first elongated boom.

16. The boom sprayer of claim 12 wherein said first and second spray fluid conduits are rigid tubes.

* * * * *